UNITED STATES PATENT OFFICE.

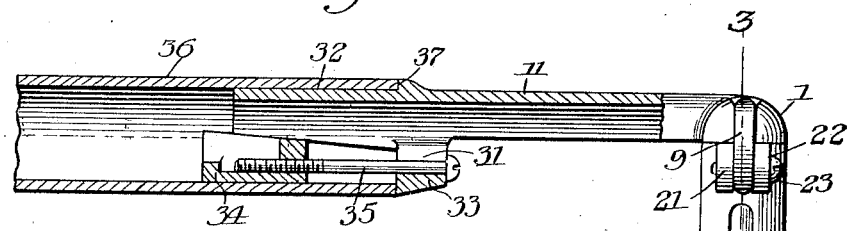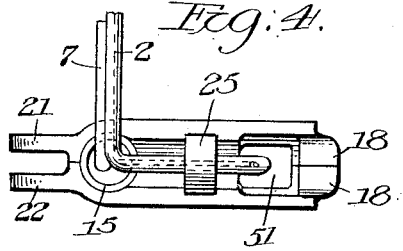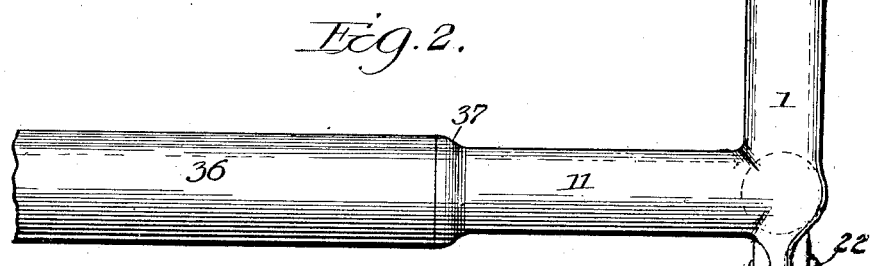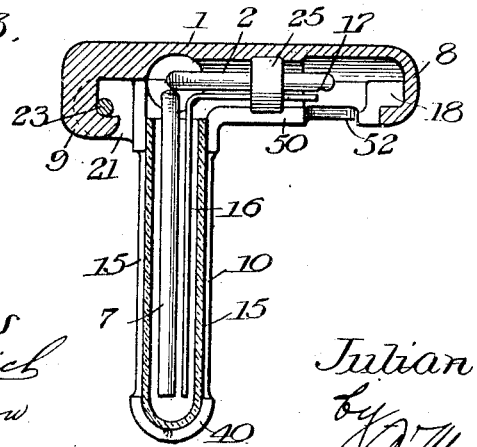

JULIAN GIFFORD GOODHUE, OF CHICAGO, ILLINOIS.

ATOMIZER.

1,329,834.  Specification of Letters Patent.  Patented Feb. 3, 1920.

Original application filed May 13, 1912, Serial No. 696,901. Divided and this application filed March 12, 1913, Serial No. 753,651. Renewed June 21, 1919. Serial No. 305,912.

*To all whom it may concern:*

Be it known that I, JULIAN G. GOODHUE, a citizen of the United States, residing at Chicago, in the county of Cook and State of Illinois, have invented a certain new and useful Improvement in Atomizers, of which the following is a full, clear, concise, and exact description, reference being had to the accompanying drawings, forming a part of this specification.

My invention relates to an improved form of atomizer and has as its principal object the provision of a device which may be assembled and installed with a minimum of labor and expense.

A further object resides in the particular arrangement and combination of parts hereinafter described.

Referring more particularly to the drawing, Figure 1 is a side elevation of my device partly in section, and showing a portion of a support;

Fig. 2 is a top plan view of Fig. 1;

Fig. 3 is a cross sectional view on the line 3—3 of Fig. 1, and

Fig. 4 is a plan view with the cap or cover piece of my device removed.

In the separate views the same part is designated by the same reference character.

Referring more particularly to the drawings, 1 is a cap or cover piece provided with an integral extension or shank 11 at right angles to itself. The cap 1 and shank 11 are both hollowed out so as to be substantially semi-circular in cross section. The shank 11 is provided with a wedge shaped extension 32 at the end opposite the cap 1. The wedge portion 32 is adapted to be inserted within a pipe or similar tubular support such as 36. The shank 11 is also provided with an upstanding ridge or lug 37 which is adapted to contact with the end of the pipe such as 36. 33 is a lug depending from the under surface of the shank 11, provided with an aperture 31. 34 is a separate wedge shaped piece adapted to fit the interior of the pipe 36 and having an edge beveled oppositely to the inclined edge of the portion 32. The wedge piece 34 is provided with a threaded aperture intended to receive the end of a screw 35 which is inserted in the aperture 31 of the lug 33. The head of the screw 35 is intended to contact with the outer surface of the lug 33. Consequently when the screw is turned, the wedge 34 is drawn to the right, as shown in Fig. 1, firmly wedging the part 32 against the interior of the pipe. By means of the arrangements just described the shank 11 and the parts of the atomizer attached thereto will be securely held by means of a pipe or other tubular support.

One end of the cap piece 1 is provided with a hook-shaped integral lug 9. The lug 9 lies in the center of the cap 1 in a substantially vertical plane and depends below the lower edge of the part 1. At the end of the part 1 opposite the lug 9 is a hollow cap or boss 8 which also depends below the edge of the part 1. Carried beneath and depending from the part 1 are two similar castings 13 and 14. Parts 13 and 14 comprise a vertically depending half round hollow portion 10, and a horizontal arm or extension 50. The portions 10 are capped off at the bottom, as shown at 40 in Fig. 3, so that when parts 13 and 14 are placed with edges together, as in Fig. 1, they may retain an internal receptacle 15 intended to retain a liquid to be atomized.

The vertical edges of the parts 13 and 14 are cut away for a portion of their extent, as shown at 41. This feature may be omitted, however, if desired. Each horizontal portion 50 is provided with a notch 52 in its lower edge. The notches 52 register with each other as shown at 51 in Fig. 4, when the parts 13 and 14 are in position, thus forming an aperture through which a spray may be delivered. The outer end of each portion 50 is provided with a lug 18 which is intended and adapted to be inserted in the boss or cap part 8, and to sustain one end of the part 13 or 14. The parts 13 and 14 are also provided with lugs 21 and 22 respectively at the end opposite the lug 18. Lugs 21 and 22 lie on each side of the hook-shaped lug 9 and are apertured to receive a screw 23 which holds the parts 13 and 14 together, and since it passes above the lower lip of the lug 9 it serves in connection with the lugs 18 to sustain the parts 13 and 14. The interior receptacle 15 which receives and retains the liquid to be sprayed may be of glass or other suitable material. This receptacle is shown in the form of a tube closed at the bottom and open at the top. Liquid is delivered to the receptacle by means of a small tube 7 which is designed to run underneath the shank 11 and supply liquid from some exterior source or reservoir. 2 is a small tube similar to the tube 7 which is designed to be connected to a door check or suitable course of compressed air. The outer end of the tube 2 is closed off except for an aperture 17 which faces downwardly through the opening 51. The tube 2 also is run along the under face of the shank 11. 16 designates a small tube which delivers liquid from the liquid receptacle and runs to a point immediately underneath the aperture 17 in the tube 2. The upper end of tube 16 being open a blast of air delivered through the aperture 17 draws up liquid through the tube 16 and produces a spray downwardly through the aperture 51. Tubes 2 and 16 are run horizontally underneath portion 1 as best shown in Fig. 3, and pass through an apertured cylindrical plug 25 near their outer end. Plug 25 rests in registering grooves in the faces of parts 1 and 50.

The subject matter of this application is divided from my copending application Serial No. 696,901, filed May 13, 1912, for disinfecting apparatus.

Having thus described my invention, what I claim is:

1. An atomizer having a hollow cap piece provided with a shank extending at right angles thereto, in combination with a pair of hollow half round members depending from said cap.

2. An atomizer having a shank 11 provided with a laterally projecting end 1, and a reservoir depending from the point of connection of the shank and end and having a nozzle arrangement in said end 1 removed from said reservoir.

3. An atomizer comprising a shank having a transversely extending end, said end having a recessed portion, a member carrying a reservoir constructed to be inserted into said recessed portion, and means for securing said parts together.

4. An atomizer comprising a shank having a transversely disposed end portion, said end having a recessed portion provided in its under side, a member carrying a reservoir construction to be inserted into said recessed portion, and means for securing said parts together.

5. An atomizer comprising a supporting member having a transversely arranged end portion, a pair of depending members 13 and 14 detachably secured to the end portion, and a reservoir 15 carried by and detachably held in position by said members 13 and 14.

6. An atomizer comprising a supporting member having a transversely extending end portion, a pair of depending members 13 and 14 having their ends detachably supported at the ends of said transversely extending end portion, and provided with downward extensions forming a hollow chamber, and a detachable reservoir arranged within said hollow chamber.

7. An atomizer comprising a supporting member having a transversely extending end portion, a pair of depending members 13 and 14 having their ends detachably supported at the ends of said transversely extending end portion, and provided with downward extensions forming a hollow chamber, a detachable reservoir arranged within said hollow chamber, and tubes 2, 7 and 16 for forming an orifice device near the outer end of said transverse end portion, and for establishing communication between said reservoir and said orifice device.

8. An atomizer comprising a supporting member having a transversely extending end portion, depending members 13 and 14 having downward extensions forming a hollow tubular chamber, said members 13 and 14 being detachably supported at their ends to the ends of said end portion, a glass reservoir arranged within said hollow tubular chamber, a pipe 2 extending along said supporting member and toward the end of said end portion, said pipe 2 being bent and being provided with an orifice 17 in its lower side, a tube 16 extending from the reservoir upwardly and to the orifice 17 in the tube 2, and a tube 7 extending along said supporting member and into the reservoir 15, said members 13 and 14 having an opening 51 in their lower edges to permit the outlet of the spray.

9. An atomizer comprising a longitudinally extending supporting member having a transversely arranged end portion, which end portion is provided at its ends with engaging members, and means for supporting a reservoir, said means being adapted to engage said engaging members at the ends of said end portion.

10. An atomizer comprising a member 11 having a transverse end portion 1, a pair of members 13 and 14 arranged underneath said portion 1 and extending lengthwise of the same from end to end thereof, said members 13 and 14 having lugs 18 adapted to fit into one end of the end portion 1 and also having lugs 21—22 adapted to fit on opposite sides of the other end of said end portion and a screw 23 extended between the lugs 21 and 22 and engaging a shoulder on the end portion 1.

11. An atomizer comprising a member 11 having a transverse end portion 1, a pair of members 13 and 14 arranged underneath said portion 1 and extending lengthwise of the same from end to end thereof, said members 13 and 14 having lugs 18 adapted to fit into one end of the end portion 1 and also having lugs 21—22 adapted to fit on opposite sides of the other end of said end portion, a screw 23 extended between the lugs 21 and 22 and engaging a shoulder on the end portion 1, a reservoir carried by the members 13 and 14 and tubes for said reservoir.

12. The combination of a tubular member 36, a shank 11 having an end adapted to fit into the tubular member 36, said member 11 being semi-tubular and open underneath and being provided with a transversely extending end portion 1 and a reservoir and atomizer devices supported by said portion 1.

13. The combination of a tubular member 36, a shank 11 having an end adapted to fit into the tubular member 36, said member 11 being semi-tubular and open underneath and being provided with a transversely extending end portion 1, in combination with means for detachably securing an end portion of the member 11 in position in the tubular member 36 and atomizer devices supported by the end portion 1.

14. The combination of a tubular member 36, a shank 11 having an end adapted to fit into the tubular member 36, said member 11 being semi-tubular and open underneath and being provided with a transversely extending end portion 1, in combination with means for detachably securing an end portion of the member 11 in position in the tubular member 36, and tubes or pipes extending through the member 36 and within the semi-tubular structure of the member 11, at least one of said pipes being bent to extend along the transverse end portion 1.

15. An atomizer comprising a supporting member having a transversely extending end, a member depending from said end, said member comprising separable parts and forming a means for supporting a reservoir.

16. In an atomizer, a pair of separable members, a plurality of tubes provided between said members, a reservoir carried by one of the members, and a member provided between said separable members, said last mentioned member forming a means for supporting said tubes.

17. An atomizer comprising in combination, a supporting member having an open side, a member constructed to be mounted in the open side of said first mentioned member, said last mentioned member carrying a reservoir, a plurality of tubes provided between both of said members, and an aperture provided in said second mentioned member, said aperture being positioned adjacent one end of said tubes.

18. An atomizer comprising a shank having a transversely extending end, the under side of said end being open, a reservoir structure constructed to be mounted in the opening of said end, and means for mounting said structure in the open side of said transversely extending end.

19. An atomizer comprising a shank having a transversely extending end said end being open upon one side, a nozzle mounted in said end, a reservoir having a portion which extends below said opening and adapted to be inserted and mounted in said open end.

20. In an atomizer structure in combination, a channeled supporting member having a transversely arranged end portion, a reservoir structure constructed to be mounted in the transversely arranged end portion, and means for securing said reservoir structure to said channeled supporting member.

21. An atomizer comprising in combination, a support or holder having a body portion and a transverse end portion, said end portion being open along one side, a structure carrying a reservoir constructed to be mounted in said open side portion, said reservoir being positioned adjacent the juncture of the transverse end portion and the body portion.

In witness whereof I hereunto subscribe my name this 21st day of December, A. D. 1912.

JULIAN GIFFORD GOODHUE.

Witnesses:
  A. L. JONES,
  O. M. WERMICH.